Aug. 3, 1965     R. A. HARTLEY     3,199,097
INDICIA WHEEL DISPLAY APPARATUS HAVING MAGNETIC
CLUTCHING TO DRIVE SHAFT
Filed Sept. 14, 1959     3 Sheets-Sheet 1
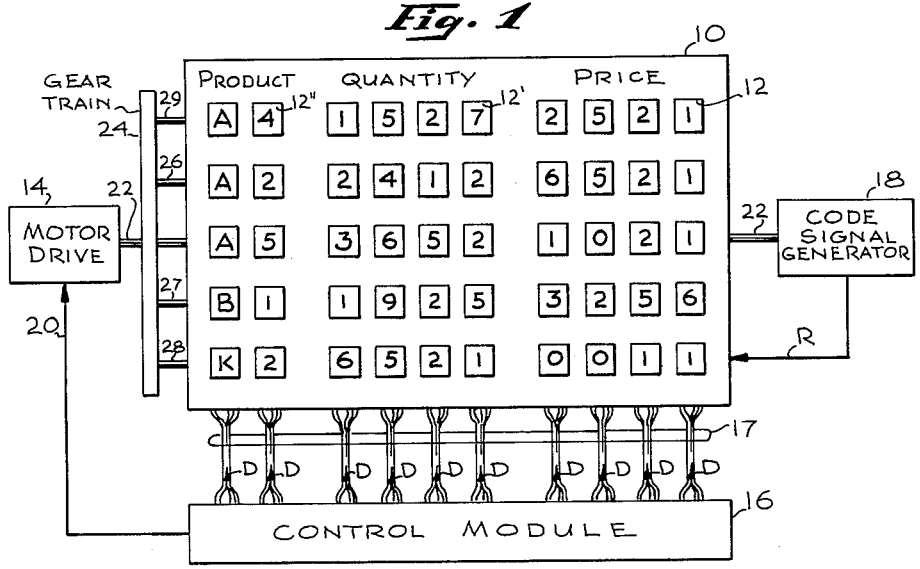
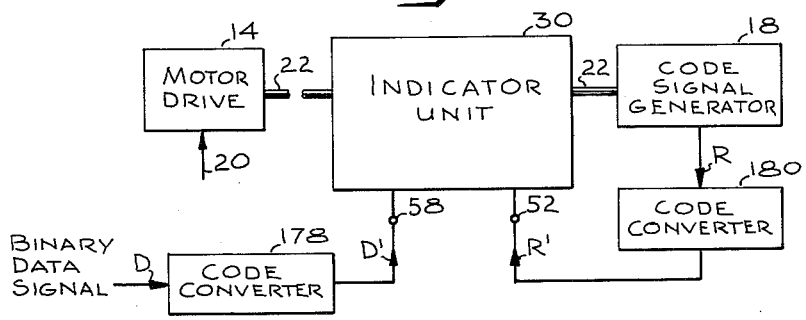
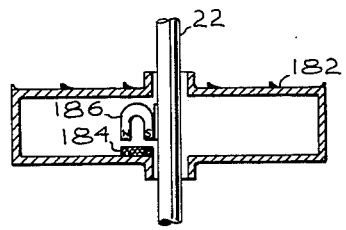
RICHARD A. HARTLEY
INVENTOR.
BY [signature] agent
[signature]
ATTORNEY

RICHARD A. HARTLEY
INVENTOR.

BY

ATTORNEY

Aug. 3, 1965 R. A. HARTLEY 3,199,097
INDICIA WHEEL DISPLAY APPARATUS HAVING MAGNETIC
CLUTCHING TO DRIVE SHAFT
Filed Sept. 14, 1959 3 Sheets-Sheet 3

RICHARD A. HARTLEY
INVENTOR.

BY Frederick M Arbuckle
agent

Morris Spector,
ATTORNEY

United States Patent Office 3,199,097
Patented Aug. 3, 1965

3,199,097
INDICIA WHEEL DISPLAY APPARATUS HAVING MAGNETIC CLUTCHING TO DRIVE SHAFT
Richard A. Hartley, Tarzana, Calif., assignor, by mesne assignments, to The Bunker-Ramo Corporation, Stamford, Conn., a corporation of Delaware
Filed Sept. 14, 1959, Ser. No. 839,863
15 Claims. (Cl. 340—324)

This invention relates to position control systems and more particularly to an improved arrangement for selectively controlling the rest position of a mechanical member about its axis of rotation as, for example, employed in some types of data display systems.

Control systems for selectively positioning rotatable members about their respective axes of rotation are used in a number of devices. Perhaps one of the most common examples of the use of such position control is found in certain data display systems. Data display systems for electromechanically displaying large quantities of digital information usually take the form of large display boards having a plurality of viewing windows arranged in a row-column array. In one general type of such system, there is associated with each viewing window and rotationally supported behind the display board a display wheel upon which is recorded the numbers, figures or other indicia to be selectively displayed in response to externally applied data signals. The control of each wheel is usually obtained by the use of a position control system employing a controlled motor drive arrangement responsive to data signals for rotating the wheel to a position causing the display of a desired number or indicium. Such a control system includes a separate motor drive and separate electrical circuitry for each wheel of the display board. It is, therefore, readily seen that position control systems of this nature, when utilized for controlling the display of large quantities of information, become quite expensive to fabricate and operate due to the initial cost of each mechanism and the high maintenance expenses necessitated by the large number of movable parts and duplicated control circuitry.

In view of the above, there is provided as one embodiment of this invention a novel and economical position control system for selectively positioning any number of rotatable mechaical members about their axes of rotation at selected ones of a plurality of predetermined rest positions. More particularly the rotatable mechanical members whose rotational positions are to be selectively controlled are mounted for free moving rotation about a common drive shaft. The drive shaft is also adapted for rotation about its axis of rotation with respect to a reference support member. To cause rotation of each mechanical member with respect to the reference member, there is provided a phase-selective coupling means for mechanically coupling each mechanical member to the rotating drive shaft. This phase-selective coupling means may take the form of a permanent magnet clutch mechanism having a phase-synchronous, "lock-in" or coupling characteristic such that the mechanical member may be caused to lock-in to the rotating drive shaft and maintain a predetermined known and fixed mechanical phase relationship with respect to the rotating drive shaft. The mechanical member thus coupled to the shaft will then rotate with respect to the reference member at the same angular velocity as the shaft, and the instantaneous angular position of the member about its axis will then be directly related, by the above-known fixed phase relationship, to the instantaneous angular position of the drive shaft about its axis.

In accordance with one preferred form of the present invention, the clutch mechanism, as well as having a phase-synchronous, lock-in characteristic, as described above, also possesses a self-limiting, torque-transfer characteristic. This means that should any external force, such as that transmitted by a stop device, be applied to the mechanical member which necessitates a greater transfer of torque than the particular limit of the clutch, the clutch will effectively disengage as by permitting continued slippage to occur between the shaft and the mechanical member. By establishing a relatively low torque transfer limit, the motion of any of the mechanical members relative to the reference member may thereby be arrested without substantially modifying the rotational movement of the shaft and other mechanical members coupled thereto. Therefore, to arrest the motion of any mechanical member relative to the reference member at any one of a predetermined plurality of stop positions, there are provided a number of stop devices, one associated with each mechanical member. To position any one mechanical member at a given stop position, the stop device associated with the mechanical member is caused to release its restraint on the mechanical member to allow the mechanical member a period of free rotation about the shaft until such time as the clutch mechanism establishes the above-described phased lock-in of the mechanical member to the drive shaft. After lock-in has occurred, means are provided for actuating the stop device whenever the rotational phase of the shaft, relative to the reference member, substantially corresponds to the desired stop position of the mechanical member.

More particularly, in order to selectively control the stop device associated with a particular mechanical member, there is provided means for comparing an externally applied data signal, indicative or representative of a particular desired stop position of the mechanical member, with a reference signal indicative of the angular displacement of the mechanical member both relative to the reference member (or a reference stop position). When a correlation between these signals occurs, the stop device is actuated, and the motion of the particular mechanical member arrested at the desired position. The reference signal required for such a control is conveniently produced, in accordance with the invention, by a reference signal generator directly coupled to one extremity of the drive shaft. The reference signal generator is so constructed that the reference signal produced thereby is different for each of those positions of the drive shaft which correspond to a possible stop position of the mechanical member. Therefore, after lock-in or coupling of any particular mechanical member has occurred, the reference signal generated, at any instant, depicts the instantaneous angular displacement of the mechanical member relative to the reference member. Consequently, as the drive shaft and the mechanical member rotate together, a discretely different signal is generated by the reference signal generator for each possible stop position which the mechanical member passes through.

In order to permit the selective positioning of all mechancial members simultaneously or contemporaneously, separate signal comparator means may be associated with each stop device. Since all mechanical members during repositioning are eventually locked to or coupled to the drive shaft in the same relative phase relationship, the reference signal is indicative of the angular displacement of all mechanical members, after lock-in has occurred, and may be applied in common to all comparator means for comparison with the respectively different data signals also applied to the individual comparator means.

From the above, it is seen that the present invention provides simplified position control means for controlling the individual rest positions of a plurality of rotatable members all mounted for free rotation about a common rotationally driven shaft.

In large data display systems of the type above described employing viewing windows arranged in a row-column array, the control system of the present invention is particularly valuable. In such an embodiment of the invention, each row or column of the display is provided with a separate drive shaft in turn driven from a common motor drive. The indicia display device for each window of a given row or column then comprises a cylinder adapted for free axial rotation about the shaft. The indicia to be selectively displayed are delineated on the periphery of the cylinder. The position control of these cylinders as mechanical members supported on a common shaft may then be carried out as above described, with the data signal applied to the comparator means associated with each cylinder, dictating the particular indicium to be displayed through that viewing window associated with a given cylinder. A single reference signal generator as above described may then serve all comparators.

The above, as well as other features of this invention, may be more readily understood by reference to the following detailed description, when taken in connection with the drawings, wherein like reference numerals represent like elements, and in which:

FIGURE 1 is a combination block and diagrammatic illustration of one general form of data display systems embodying the features of this invention;

FIGURE 4 is a block diagram illustrating an arrangement for utilizing circuitry associated with FIGURE 2, when data signals of the type employed in the arrangement of FIGURE 3 are utilized; and FIGURE 5 is a cross sectional view of a display wheel embodying certain features of the present invention.

Figure 2:
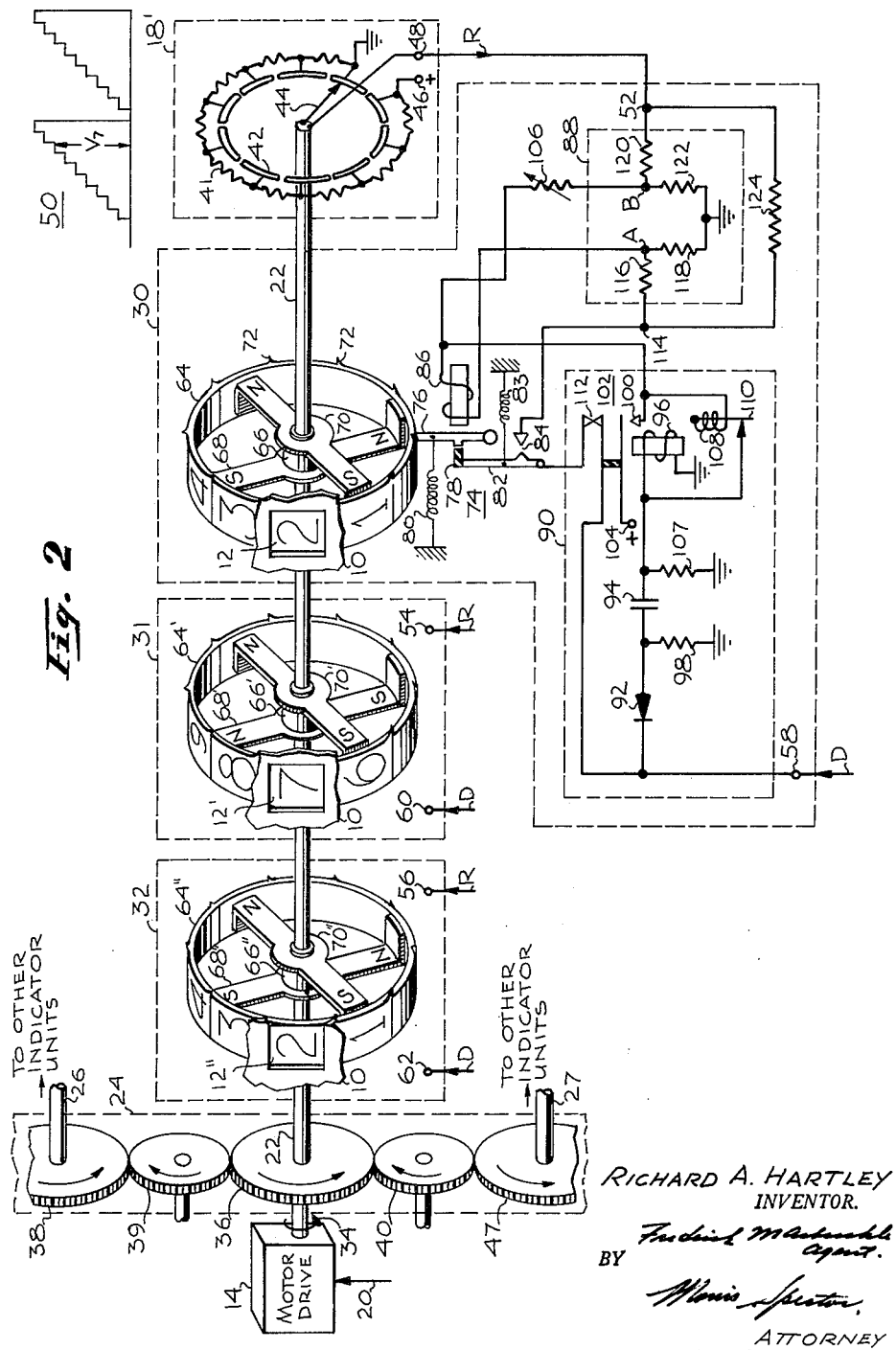
FIGURE 2 is another block and diagrammatic illustration of a display system shown in FIGURE 1 and useful in the arrangement embodying a preferred form of position control arrangement, in accordance with the present invention, for controlling the display of data in response to one type of data signal.

Referring more particularly to FIGURE 1, there is generally depicted one form of data display apparatus utilizing the position control features of this invention. A display board 10 is provided serving as a reference support member for a number of associated indicia display devices each viewable through viewing windows, of which 12, 12' and 12" are examples. These viewing windows are organized in a row-column array. By way of illustration only as to how such a display apparatus may be employed in commerce, the first group of two columns (taken from left to right) may be utilized to display indicia designating a particular commodity or product, the second group of four columns indicia designating the quantity of the product available and the third group indicia designating price. The mechanical power required to change the indicia displayed by any one or all display devices is provided, in accordance with the present invention, by a single motor drive 14. The actual indicia displayed by the display devices are controllably changed by a comparison between respective data signals D supplied from a control module 16 over cables 17, and a reference signal R supplied by a code signal generator 18. In general, as it is desired to change one or more of the indicia or figures displayed by board 10, particular data signals, indicative of the particular figures to be displayed are transmitted from control module 16 via cables 17 to display apparatus. Simultaneously with the transmission of data signals D, an excite signal is also transmitted from control module 16, over line 20 to the motor drive 14. The application of excite signal 20 to motor drive 14 produces a rotation of a master drive shaft 22 which in turn produces rotation, via a gear train 24, of slave drive shafts 26, 27, 28 and 29. As will be explained in detail hereinafter in connection with FIGURE 2, the rotation of master drive shaft 22 causes a reference signal R to be generated by a reference signal generator indicated in the drawing as code signal generator 18. Reference signal R is applied to display apparatus where it is compared with each of the data signals D supplied by control module 16. The output of this comparison is then utilized to control or determine what indicia or figures will be displayed through the various viewing windows.

One way in which this control may be exercised, in accordance with the present invention, may be best understood through reference to FIGURE 2.

More specifically, there is disclosed in FIGURE 2 a display system utilizing a position control arrangement embodying the features of this invention for electromechanically controlling the display of information in response to analog data signals. As shown, a plurality of indicator units illustrated within dotted line rectangles 30, 31 and 32 are controllably driven by a common motor drive 14 through a master drive shaft 22. The direction of rotation of drive shaft 22 is indicated by arrow 34.

Coupled to master drive shaft 22 is a gear train generally shown within dotted line rectangle 24 including, by way of illustration only, drive gears 36, 38 and 47 and idler gears 39 and 40. Drive gears 38 and 47 provide rotational drive through slave drive shafts 26 and 27 for other indicator units (not shown). Idler gears 39 and 40 permit suitable spacing to be established between the master and slave drive shafts as well as enforcing the same direction of rotation for all drive gears.

At one extremity of master drive shaft 22, there is provided a reference signal generator shown within dotted line rectangle 18'. It is the purpose of reference signal generator 18' to generate for delivery to terminal 48 thereof a reference signal R depicting or representing the specific magnitude of angular rotation of master drive shaft 22 with respect to some fixed reference such as the viewing windows 12. By way of example only, reference signal generator 18' is shown to be comprised of a voltage divider 41 having a plurality of taps such as 42. These taps are commutated by a wiper 44 which is mechanically coupled in fixed relation to the shaft 22. By way of example, one end of voltage divider 41 is connected to a source of positive potential having a terminal indicated at 46 while the other extremity of the voltage divider is connected to reference ground potential. Electrically coupled to the wiper 44 is an output terminal 48. As shaft 22 is rotated thereby producing commutating action of wiper arm 44, a stepped voltage is produced at output terminal 48. This stepped voltage may appear as depicted at 50. Therefore, as wiper arm 44 passes the tap associated with reference ground, a zero voltage is produced at output terminal 48. As the wiper arm continues to be driven in the direction of arrow 34 (shown adjacent motor drive 14), the voltage delivered increases step by step until a maximum is reached at the tap associated with terminal 46. The output signal R produced by reference generator 18' is applied in common to all indicator units such as 30, 31 and 32 at terminals 52, 54 and 56, thereof. Also applied to each of these indicator units is an independent data signal D emanating from a control module such as 16 in FIGURE 1. These independent data signals are applied to terminals 58, 60 and 62 associated with indicator units 30, 31 and 32, respectively.

Considering now the structure of indicator unit 30, there is shown at 64 a mechanical member mounted for free moving rotation about the shaft 22. The member 64 is adapted to serve as a light-weight display device and may take the form of a wheel, disc cylinder, etc. As shown, the member 64, hereinafter referred to as a display cylinder or mechanical member, has delineated on its periphery a number of indicia such as the numbers from zero to nine. These numbers may be viewed one at a time through a viewing window 12 such as that associated with display board 10 in FIGURE 1. The display board 10, as well as the extremities of windows therein, also serves as mechanically fixed references for all rotatable members of the system. As stated, display cylinder 64 is mounted for free rotation to and fro about master drive shaft 22 by a bearing arrangement 66.

To impart rotational drive to the display cylinder 64, as is required during controlled repositioning thereof, there is provided, in accordance with the present invention, some form of phase selective coupling means between the shaft 22 and the cylinder 64. Such is provided, by way of example, by the magnetic elements 68 and 70 to be discussed shortly. The phase selective character of this coupling means ensures that a magnetic coupling or lock-in between the shaft 22 and display cylinder 64 can only occur upon the condition that the cylinder 64 bears a predetermined known and fixed phase relationship with respect to the shaft 22. The cylinder 64, thus coupled to the shaft, will then rotate with respect to the viewing window 12 at the same angular velocity as the shaft 22. Because of the known locked-in and fixed phase relation between the shaft 22 and the cylinder 64, the magnitude of the reference signal, during such lock-in, will substantially always depict the instantaneous position of the cylinder and the indicium being displayed thereby through the viewing window 12.

As will become apparent, in a preferred form of the present invention, the phase-selective coupling means, as well as having phase-synchronous lock-in characteristics, as described above, is also possessed of a self-limiting, torque-transfer characteristic. This means that should any external force, such as that transmitted by a stop device, be applied to the mechanical member which necessitates a greater transfer of torque than the particular limit of the clutch, the clutch will effectively disengage as by permitting continued slippage to occur between the shaft and the mechanical member. By establishing a relatively low torque transfer limit, the motion of any of the mechanical members relative to the reference member may thereby be arrested without substantially modifying the rotational movement of the shaft and other mechanical members coupled thereto.

The coupling means comprised of magnetic elements 68 and 70 in FIGURE 2 also provides such a self-limiting, torque characteristic.

Specifically in FIGURE 2, pole magnet 68 extends across the diameter of cylinder 64 and is attached to the inner walls thereof. A second pole magnet 70 is permanently attached to master shaft 22. Thus as master shaft 22 rotates, there will be one and only one position thereof where a lock-in or magnetic coupling of pole magnet 68 with pole magnet 70 will occur thereby producing a rotation of cylinder 64. This lock-in is due to the magnetic attraction of a south pole of a bar magnet for the opposite or north pole of an adjacent bar magnet. Also in accordance with the features of this invention, the magnetic arrangement possesses a limited torque transfer characteristic in that the coupling forces are limited to the magnetic attraction of magnets 68 and 70.

Cylinder 64 is, therefore, provided with a number of stop teeth 72 each associated with a different indicium on the cylinder and each adapted for cooperation with the stop finger 76 of a stop device 74. These stop teeth are so positioned that engagement of the stop finger 76 of stop device 74 with any stop tooth will cause a corresponding one of the numerals on the periphery of cylinder 64 to be centrally disposed within viewing window 12. By way of example only, a stopping means such as stop device 74 is disclosed as being of an electromagnetic relay variety having an actuating winding 86. Stop device 74 is so arranged that when the winding 84 is not energized, the stop finger 76 is normally in tensioned contact against a stop tooth to restrain motion of the cylinder 64. This tension may be provided by means of a spring arrangement 80. An auxiliary arm 82 associated with the relay 74 is also spring tensioned in an opposite direction to that of stop finger 76 as provided by a spring 83 thereby maintaining tensioned contact between the insulator 78 of arm 82 and stop finger 76. Also, associated with arm 82 is a first pair of electrical contacts 84. Upon the energization of relay winding 86, stop finger 76 moves away from the cylinder allowing cylinder 64 to rotate upon lock-in of magnets 68 and 70. Once lock-in has occurred, the value of the voltage appearing at the reference generator output terminal 48 can be used to identify what indicium or figure is being displayed through the viewing window 12. Likewise as any one of the other display apparatus cylinders, such as 64′ or 64″, rotates in locked-in synchronism with shaft 22, the reference voltage generated by the reference generator 18′ will be indicative of the figure being momentarily displayed through the window associated with that cylinder.

In order to control the rest or stopped position of a cylinder such as 64, there is provided, in electrical association with relay 74, a comparator means such as indicated by the dotted line rectangle 88 and a delay means generally indicated by the dotted line rectangle 90. Comparator means 88 ultimately receives and compares the reference signal R, generated by the reference signal generator 18′, with the data signal D. Upon correlation or matching agreement of these signals, stop device 74 is released and cylinder 64 stopped. Delay means 90 receives the data signals D applied to the indicator unit 30, produces an immediate energization of stop device winding 86, thereby releasing cylinder 64 allowing lock-in to occur. The delay device 90 also acts to delay the data signal for a period of time great enough to insure lock-in and then applies the data signal to the comparator network 88. As will be seen, the delay provided by delay network 90, according to the invention, is of sufficient magnitude to ensure that lock-in occurs prior to the actual comparison of data and reference signals. If an appropriate delay were not introduced, agreement between these signals might occur prior to actual phase lock-in between the shaft 22 and cylinder 64. Under these conditions, the stop device 74 would be de-energized to cause stoppage of cylinder 64 at an undesired position. Such operation would produce display error.

This problem may be more completely understood by reference to indicator unit 30 in FIGURE 2. If, for example, it were desired to change the figure displayed in viewing window 12 from the figure two to the figure one and the data and reference signals were compared at a time when stop device 74 was first energized, a reference signal indicative of a one would be generated before drive shaft 22 would have time to rotate to a lock-in position. Therefore, an agreement between data and reference signals would occur in comparator 88 and stop device 74 would be released prior to any movement of cylinder 64. The figure two would then remain displayed through viewing window 12.

By way of illustration, there is shown in FIGURE 2 suitable circuitry for carrying out the function of comparator 88 and delay network 90 in providing stop and start control of indicator unit 30. A data signal D indicative of the figure to be displayed by indicator unit 30 is applied to terminal 58 of delay network 90. Simultaneously with the application of data signal D to terminal 58, an excite signal is applied to motor drive 14 via lead 20 thereby producing a rotation of the associated drive shafts.

If data signal D applied to terminal 58 is of a certain minimum magnitude, it will be passed by a zener diode 92 and begin to charge capacitor 94. The charging current of capacitor 94 will then energize winding 96 of relay 102. High resistance element 98, having one of its terminals connected at a point between capacitor 94 and diode 92, having its other terminal connected at a reference ground provides a current path along with resistor 107 for discharging capacitor 94 between the applications of different reference signals to terminal 58. Energization of winding 96 instantaneously closes normally open contacts 100 associated with a relay 102. The closing of contacts 100 allows current to flow from a source of positive potential 104 through contacts 100 to the winding 86 of stop device 74. Upon the application of the voltage from source 104 to winding 86, stop device 74 is energized removing stop finger 76 from engagement with a cylinder stop tooth and allowing the cylinder 64 to freely rotate about shaft 22. This permits the aforementioned lock-in between shaft 22 and cylinder 64 to occur. The current from source 104 is also applied through a normally closed temperature sensitive cut-out relay 108 to the winding 96 of relay 102, thereby maintaining the closure of contacts 100 after the initial charging of capacitor 94.

Still referring to FIGURE 2, upon the continued application of current from source 104 through temperature sensitive relay 108 to winding 96, relay 108 will, after a predetermined time, heat up sufficiently to cause the normally closed contacts 110 associated therewith to open. This releases the relay 102, opens contacts 100 and causes contact to be made between normally closed contacts 112. The time required for relay 108 to cause opening of contacts 110 should be such to allow at least a 360° revolution of shaft 22 to occur. This will insure lock-in of bar magnets 68 and 70 as before described.

Upon the closing of contacts 112 in FIGURE 2, data signal D is then applied, through contacts 112 of relay 102 and through now closed contacts 84, of stop device 74, to input terminal 114 of the comparator circuit 88. By way of example only, comparator circuit 88 comprises a pair of series resistances, each coupled between one of input terminals 114 and 52 to reference ground. Specifically, connected between terminal 114 and ground are series resistances 116 and 118 and coupled between terminal 52 and ground are series resistances 120 and 122. The resistance value of these resistors are preferably so proportioned that if equal voltages are applied at terminals 114 and 52, the same magnitudes of voltage will be developed at each of the output terminals A and B. Also coupled between terminals 114 and 52 is a low external resistance 124. It is this resistance which maintains a substantially zero output voltage across output terminals A and B of voltage comparator 88, during the applications of reference signal to terminal 52 in the absence of a data signal at terminal 114. Output terminal B of comparator 88 is coupled through a current limiting element 106 having a high positive temperature characteristic to one terminal of winding 86. Terminal A of comparator 88 is connected to the remaining terminal of winding 86. Therefore, if signals are applied from a data source and the reference signal generator 18' to comparator 88, and these signals are not of the same magnitude, a voltage is produced between points A and B. Thus if analog reference signal R, indicative of the figure being displayed by locked-in cylinder 64 and analog data signal D indicative of the figure it is desired to be displayed are not in agreement, the voltage produced between terminals A and B will cause operating current to flow through stop device winding 86 thereby maintaining the release of the cylinder 64 by stop device 74. If reference signal R is substantially in agreement with data signal D, meaning that the desired figure is then being displayed by cylinder 64, a substantially zero voltage will be produced between terminals A and B and no current will flow in winding 86. Stop device 74 will, therefore, be released to stop the cylinder 64 at a point such that the particular desired figure is displayed in viewing window 12.

As can be seen, it is possible that at least a ten-unit increment might occur in the voltage between points A and B. It is, therefore, desirable that current limiting element 106 be included between comparator 88 and winding 86 to protect the stop device 74 by limiting the current through winding 86 regardless of the magnitude of the voltage appearing between points A and B.

Figure 3:
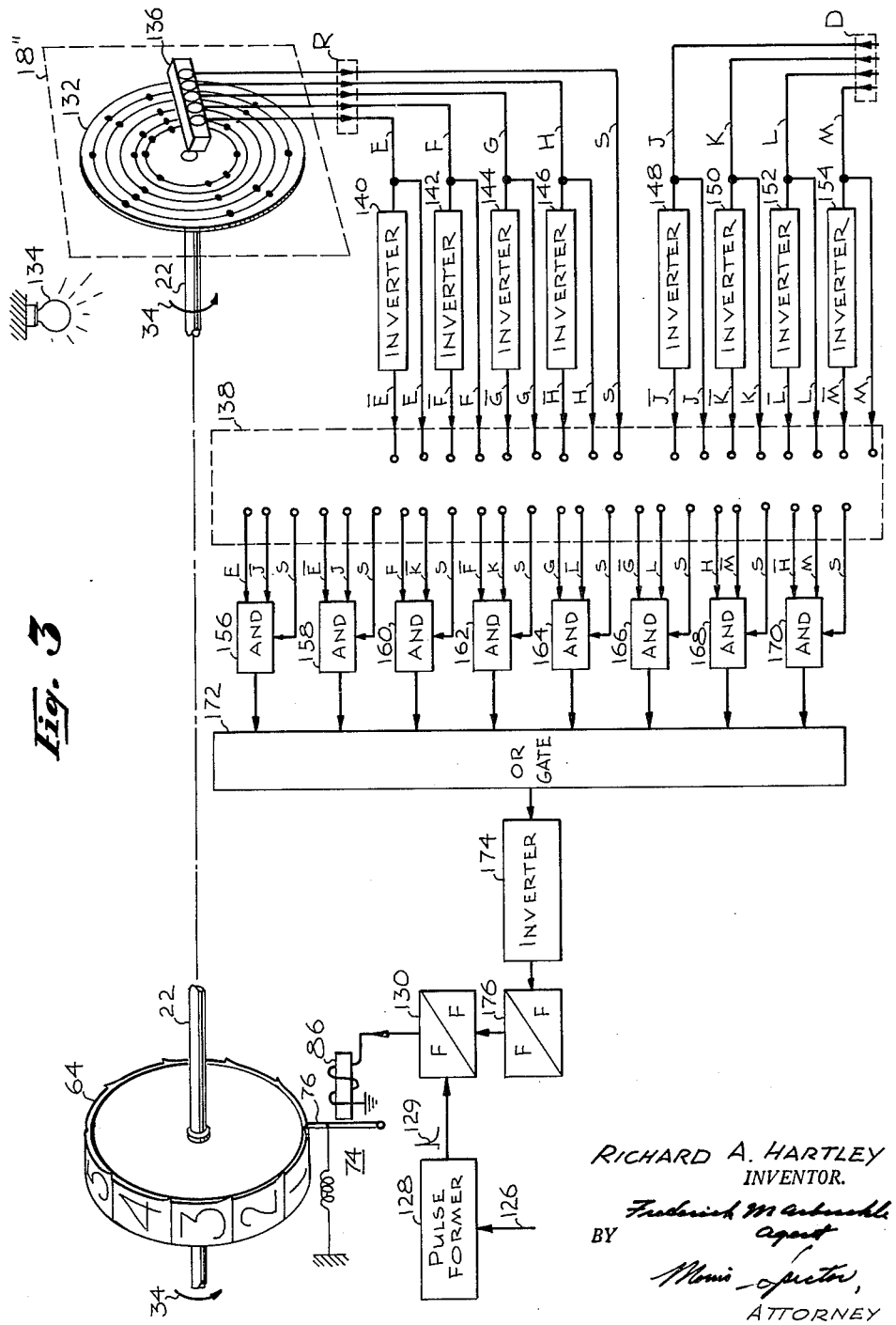
FIGURE 3 is a block diagram representation of a general circuit arrangement useful in controlling the display of data in response to another type of data signals.

Referring to FIGURE 3, which is an arrangement for automatically controlling an indicator unit in response to a coded data signal, there is shown means for applying a binary data signal, represented as D, over leads J, K, L and M. As previously described in connection with FIGURE 2, upon the application of data signal D, a motor drive (not shown) is energized and a shaft 22 begins to rotate, as represented by the arrow 34. Simultaneously with the application of binary data signal D, a single data signal 126 is applied to a pulse former 128, which produces a sharp, positive pulse represented as 129. Pulse 129 is applied to a flip-flop 130, which is in such a state that it produces a positive output signal in response thereto. The operation of flip-flop 130 energizes winding 86 of stop device 74, thereby releasing a stop finger 76 and allowing a cylinder 64 to attain lock-in drive from the shaft 22.

Similar to the arrangement described in connection with FIGURE 2, a reference signal generator designated as code signal generator 18" is coupled to one extremity of shaft 22. As shown in FIGURE 3, code signal generator 18" is arranged to generate a binary coded reference signal in response to the rotation of shaft 22. Code generator 18" is disclosed, by way of example only, to include a transparent disc 132, having relatively opaque portions shown as dark spots arranged in a coded array upon its surface. Associated with and in close proximity to transparent disc 132 is a light source 134. Also, in fixed relation to disc 132 is a network of photocells 136 so positioned, that as disc 132 is rotated by shaft 22, the relatively opaque portions of disc 132 modulate the light received by photocells 136 to generate a coded reference signal indicated as R on leads E, F, G, H and S. Similar to the arrangement of FIGURE 2, generator 18" is so oriented that the binary coded signal produced thereby is a representation of the figure which would be displayed by all rotating cylinders, such as 64, after lock-in.

Reference signal R is transmitted by leads E, F, G and H directly to a cross-connector unit 138, as well as to pulse inverters 140, 142, 144 and 146, respectively. Therefore, if, for example, a positive pulse or a "one" is applied to inverter 140 over lead E, a negative output pulse or a "space" is generated thereby. These inverted signals are also transmitted to cross-connector unit 138 over leads $\overline{E}$, $\overline{F}$, $\overline{G}$ and $\overline{H}$. Also applied to cross-connector unit 138 over leads J, $\overline{J}$, K, $\overline{K}$, L, $\overline{L}$, M and $\overline{M}$ is a coded data signal indicative of a particular figure to be displayed by cylinder 64 and represented as D. The portion of the data signal D transmitted by leads $\overline{J}$, $\overline{K}$, $\overline{L}$ and $\overline{M}$ are the outputs of pulse inverters 148, 150, 152 and 154, respectively.

As shown, the output leads associated with cross-connector unit 138 are indicative of the input leads applied thereto. Therefore, a first group of output leads, associated with cross-connector unit 138, transmits the signals applied by the input leads E, $\overline{J}$ and S, and a last group of output leads transmits the signal applied over leads $\overline{H}$, M and S. The signals transmitted by each group of output leads are applied to one of "and" gates 156 to 170. For example, the signals transmitted by leads E, $\overline{J}$ and S are applied to "and" gate 156. The signal transmitted by lead S is utilized as a clock signal for each of the "and" gates. The signals generated by these "and" gates are applied to an "or" gate 172. From this arrangement, it is readily seen that "or" gate 172 will generate an output signal for each reference signal R generated by code generator 18" which does not match a particular data signal D applied over leads J, K, L and M.

The output of "or" gate 172 is applied to a pulse inverter 174, thereby producing a positive pulse only when the match occurs between reference signal R and data signal D. The output of inverter 174 is applied to a flip-flop 176. Flip-flop 176 is initially in a positive output state. In other words, it is generating a positive output signal. Upon the application of a positive pulse from inverter 174, flip-flop 176 changes states and the positive output is removed. The second time a positive pulse is received from inverter 174, flip-flop 176 generates a positive output pulse to a flip-flop 130. Therefore, flip-flop 176 acts as a two-digit counter producing an output for every two positive inputs applied thereto. The counting function thus performed provides the rotational delay necessary to insure lock-in of cylinder 64. For the first positive pulse transmitted is indicative that the shaft 22 has rotated into such a position that a match of data signal D and reference signal R has occurred. As explained in connection with FIGURE 2, however, this does not necessarily mean that a true coincidence is present, for shaft 22 may not have rotated far enough to allow lock-in. Therefore, as the second positive pulse is transmitted by inverter 174, it is a certainty that shaft 22 has rotated at least 360°, and that lock-in has occurred. If a longer delay is desired, a series of flip-flops, such as 176, may be connected in series and the output taken from the last flip-flop indicative of the number of revolutions of shaft 22, which are desired.

As stated above, the output of flip-flop 176 is applied to flip-flop 130 which is normally in a positive output state as a result of the pulse applied from the pulse former 128. The positive output of flip-flop 176, therefore, produces a change of state of flip-flop 130, and the positive output is removed, thereby de-energizing relay 74 and releasing stop finger 76 to halt cylinder 64. Therefore, as a second match or coincidence occurs, cylinder 64 is instantaneously stopped to allow display of the particular figure indicated by data signal D.

Referring now to FIGURE 4, there is disclosed a block diagram of an arrangement for utilizing the circuitry associated with FIGURE 2, when coded data signals are received thereby.

More particularly, as described in connection with FIGURE 2, when a data signal D is applied to an indicator unit, such as 30, a motor drive 14 is energized by an excite signal 20. Motor drive 14 then produces a rotation of associated drive shafts such as master drive shaft 22, which, in turn, causes a reference signal R to be generated by a code signal generator 18. When it is desired to change the figure being displayed, a data signal D indicative of the signal to be displayed is applied to a terminal 58. Data signal D is then compared with a reference signal R which is applied to a terminal 52. Display is then controlled by this comparison.

As shown in FIGURE 3, if it is desired to change the figure being displayed by an indicator unit, such as unit 30 of FIGURE 2, in response to a binary coded data signal, a code converter 178 is interposed prior to input terminal 58. Code converter 178 may be a digital-to-analog converter, such that binary coded input signals applied thereto will produce an analog voltage output. The analog voltage output D′ is then applied to terminal 52, where it will function in the same manner as described in connection with FIGURE 2.

When it is also desired to utilize circuitry of indicator 30, of FIGURE 2, in connection with a code signal generator which produces a binary code output, such as disclosed in FIGURE 3, a code converter 180 is interposed between code generator 18 and terminal 52 of indicator unit 30. Code converter 180 may be a digital-to-analog converter which, upon receiving a binary reference signal R generated by code generator 18, produces an analog voltage output R′ which, upon transmission to terminal 52, functions as described in connection with FIGURE 2.

Therefore, by the simple addition of code converter 178 and 180, one is able to utilize circuitry responsive to analog voltages in a binary code display system.

FIGURE 5 discloses a cross section of a display cylinder utilizing a magnetic clutch arrangement, which may be used as an alternate to that described in connection with FIGURE 2. As therein disclosed, a hollow cylinder 182 has a magnetic material such as soft iron 184 attached to a cylinder wall adjacent to a shaft, such as master shaft 22. Instead of utilizing a bar magnet, such as 68 disclosed in FIGURE 2, a horseshoe magnet 186 is affixed to drive shaft 22 and oriented such that the poles of the magnet are facing the magnetic material 184. This positioning will produce a single point of phase lock-in because at only one position in the rotation of shaft 22 will magnetic material 184 be within the field of attraction of horseshoe magnet 186. Because of the necessity of only one magnet, this embodiment may be preferred to that described in connection with FIGURE 2.

What is claimed is:

1. A position control system comprising in combination: a reference support member; a drive means including a rotationally driven shaft mounted for movement about its axis of rotation relative to said reference member; a mechanical member mounted for rotation about said shaft and initially at rest relative to said reference member at one of a plurality of stop positions; means responsive to an applied data signal, indicative of a particular one of said stop positions, for releasing said mechanical member for free rotation about said drive means; permanent magnet phase coupling means coupled to said drive means and said mechanical member for substantially coupling said mechanical member to said drive means; means coupled to said drive means for generating a reference signal indicative of the angular displacement, relative to said reference member, of said mechanical member while coupled to said drive means; first means for comparing said reference signal with said data signal; and second means responsive to said first means for arresting the motion of said mechanical member, relative to said reference member, upon a predetermined degree of correlation between said reference and data signals, said permanent magnet phase coupling means being released when motion of said mechanical member has been arrested, so that said drive means can continue to rotate about its axis of rotation.

2. A position control system including: a reference support member; a drive shaft supported for movement about its axis of rotation relative to said reference member; a motor drive coupled to one extremity of said drive shaft for producing rotation of said drive shaft; a mechanical member mounted for rotation about said drive shaft including a plurality of preselected stop positions; a stop device initially arresting the motion of said mechanical member relative to said reference member at a one of said plurality of stop positions; means responsive to an applied data signal indicative of a particular one of said plurality of stop positions for disengaging said stop device thereby allowing free rotation of said mechanical member about said drive shaft; permanent magnet phase coupling means coupled to said drive shaft for substantially coupling said mechanical member to said drive shaft; means coupled to said drive shaft for generating a reference signal indicative of the angular displacement relative to said reference support member; comparing means for comparing said reference signal and said data signal and producing an output signal indicative of the comparison of the signals thereby; means for delaying the output signal of said comparing means by a selected period of time; and means responsive to the delayed output signal of said comparing means for re-energizing said device so as to arrest the motion of said mechanical member, said permanent magnet phase coupling means being released when the motion of said mechanical member has been arrested to decouple said mechanical member from said drive shaft so that said drive shaft can continue to rotate.

3. A position control system as defined in claim 2 wherein said permanent magnet phase coupling means is a phase clutch having self-limiting, torque-transfer characteristics.

4. A position control system including: a reference support member; a drive shaft mounted for movement about its axis of rotation relative to said reference member; a motor drive coupled to one extremity of said drive shaft for producing rotation of said drive shaft about said axis of rotation; a mechanical member mounted for free rotation about said drive shaft through a plurality of preselected stop positions; a stop device which when engaged operates to arrest the motion of said mechanical member relative to said reference member thereby allowing said drive shaft to rotate freely relative to said mechanical member; means responsive to an applied data signal depicting information as to the magnitude of the angular displacement, relative to said reference member, of a particular one of said stop positions for disengaging said stop device thereby allowing free rotation of said mechanical member about said drive shaft; permanent magnet phase coupling means coupled to said drive shaft and to said mechanical member for driving said mechanical member with said drive shaft in a predetermined fixed phase relation therebetween; means coupled to said drive shaft for generating a reference signal depicting information as to the magnitude of the changing angular displacement, relative to said reference member, of said mechanical member while being driven through said coupling means in said fixed phase relation thereto; first means for comparing said reference and data signals; second means responsive to the output of said first means for engaging said stop device upon agreement of the position information depicted by both said reference and data signals; and means for delaying the output of said first means for a period of time sufficient to permit said fixed phase relation to be established by said coupling means.

5. A position control system including: a reference support member; a drive shaft mounted for movement about its axis of rotation relative to said reference member; a motor drive coupled to one extremity of said drive shaft for producing rotation of said drive shaft about said axis of rotation; a mechanical member mounted for free rotation about said drive shaft through a plurality of preselected stop positions; a stop device which when engaged operates to arrest the motion of said mechanical member relative to said reference member; said drive shaft being freely rotatable relative to said mechanical member when the motion thereof has been arrested; means responsive to an applied data signal depicting information as to the magnitude of the angular displacement, relative to said reference member, of a particular one of said stop positions for disengaging said stop device thereby allowing free rotation of said mechanical member about said drive shaft; permanent magnet phase coupling means coupled to said drive shaft and to said mechanical member for driving said mechanical member from said shaft in a predetermined fixed phase relation to said drive shaft; means coupled to said drive shaft for generating a reference signal depicting information as to the magnitude of the changing angular displacement, relative to said reference member, of said mechanical member while being driven through said coupling means in said fixed phase relation thereto; first means for comparing said reference and data signals; and second means responsive to the output of said first means for engaging said stop device upon agreement of the position information depicted by both said reference and data signals.

6. A data display system including: a reference support member supporting a plurality of rotatable mechanical members aligned in rows relative to said reference member, the mechanical members of any given row being mounted for rotation about a common rotatable drive shaft serving that row, the drive shafts serving all of said rows being synchronously rotatable with respect to one another; a control system for selectively positioning the mechanical members, of any given row, comprising permanent magnet phase coupling means coupled between the common rotatable drive shaft of said given row and the respective mechanical members of said given row for substantially coupling said respective mechanical members to said common drive shaft; means coupled to each of said drive shafts for generating a reference signal indicative of the angular displacement relative to said reference member of each of said respective mechanical members when being driven in coupled relation to its associated drive shaft; and means responsive to said reference signal and applied data signals for arresting the motions of said respective mechanical members at particular angular displacements relative to said reference member indicated by said data signals, said permanent magnet phase coupling means being released when the motions of said respective mechanical members have been arrested so that said respective mechanical members are decoupled from said common rotatable drive shaft.

7. A data display system comprising: a reference support member supporting a plurality of rotatable mechanical members aligned in rows relative to said reference member, the mechanical members of any given row being mounted for rotation about a common rotatable drive shaft serving that row; means for rotating the drive shafts serving all of said rows in a predetermined relationship to one another; a control system for selectively positioning the mechanical members, of any given row, comprising permanent magnet phase-selective coupling means coupled between the common rotatable drive shaft of said given row and the respective mechanical members of said given row for substantially coupling said respective mechanical members to said common rotatable drive shaft; means coupled to each common rotatable drive shaft for generating a reference signal indicative of the angular displacement relative to said reference member of each of said respective mechanical members when being driven in coupled relation thereto; and means responsive to said reference signal and applied data signals for arresting the motions of said respective mechanical members at particular angular displacements relative to said reference member indicated by said data signals, said permanent magnet phase selective coupling means being released when the motions of said respective mechanical members have been arrested so that said respective mechanical members are decoupled from said common rotatable drive shaft which can continue to rotate.

8. A data display system comprising: a reference support member; a plurality of indicator units aligned in rows relative to said reference member, the indicator units of each row being served by a common drive shaft supported for movement about its axis of rotation with respect to said reference member, each indicator unit including a mechanical display member bearing the indicia to be selectively displayed one at a time in response to applied data signals, the mechanical member of each indicator unit being in turn mounted for rotation about an associated one of said common drive shafts; a motor drive; means for coupling all of said drive shafts to said motor drive, thereby producing rotational movement of each drive shaft with respect to said reference member; means providing a permanent magnet phase-synchronous coupling of each of said mechanical members to its associated drive shaft; means coupled to one of said drive shafts for generating a reference signal indicative of the individual indicium displayed by all phase synchronously coupled mechanical members; means for receiving distinct applied data signals each indicative of an indicium to be displayed by a different one of said mechanical members; and means for comparing said reference and data signals to arrest the motions of particular mechanical members so as to display the respective indicium indicated by said data signals, said coupling means being releasable to permit continued movement of said rotary drive means when motion of said mechanical member is arrested.

9. A display apparatus comprising: a single drive means; a plurality of display means movable through a plurality of predetermined stop positions; a plurality of permanent magnet coupling means having a phase-synchronous, self-limiting, torque-transfer characteristic for coupling said display means to said drive means, thereby producing movement of each display means through said stop positions, said torque-transfer characteristic being a function of the permanent magnetic attraction between members of said coupling means; and means including analog comparing means responsive to applied data signals for arresting the motion of said display means at selected ones of said stop positions, said coupling means being releasable to permit continued movement of said drive means when motions of said display means are arrested.

10. A display apparatus as defined in claim 9 wherein said members of said coupling means having phase-synchronous, self-limiting, torque-transfer characteristics comprise a first permanent magnetic element coupled to said drive means and a second permanent magnetic element coupled to said display means, said torque-transfer characteristics being a function of the magnetic attraction between said first and second permanent magnetic elements.

11. In an indicia display apparatus the combination of: a plurality of indicia display devices each including a rotatable indicia display member which, when at rest, exhibits one of a set of predetermined indicia; a single source of rotational drive; separate permanent magnet limited torque-transfer coupling means capable of withstanding sustained rotational slippage between two mechanical members coupled between each of the indicia display members in said display devices and said source of rotational drive, the torque-transfer of said coupling means being a function of the magnetic attraction between said two mechanical members, signal responsive means for conditionally arresting the rotational motion of any selected one of said indicia display members; means responsive to said source of rotational drive for producing a reference signal; and means responsive to an applied indicium indicating data signal and coupled to said signal responsive means for coupling said reference signal and said data signal and arresting the rotational motion of any one of said display members at a rest position corresponding to the display of the indicium indicated by said indicium indicating data signal.

12. A position control system comprising: a mechanical member movable through a plurality of selected positions; rotary drive means movable with respect to said mechanical member; permanent magnet phase coupling means attached to said rotary drive means and to said mechanical member for magnetically coupling said mechanical member to said rotary drive means, thereby producing a movement of said mechanical member through said selected positions, said coupling being a function of the magnetic attraction between said permanent magnet phase coupling means attached to said rotary drive means and to said mechanical member; means coupled to said drive means for generating a reference signal indicative of the rotational position of said rotary drive means; means for receiving a data signal indicative of a particular one of said selected positions; and means responsive to said reference and data signals for arresting the motion of said mechanical member at the particular selected position represented by said data signal, said permanent magnet phase coupling means being released when motion of said mechanical member is arrested to permit continued movement of said rotary drive means.

13. A position control system including: a reference support member; drive means comprising a rotationally driven shaft mounted for rotation about its axis relative to said reference support member; a mechanical member mounted for free rotation about said shaft; a permanent magnet phase coupling arrangement for coupling said mechanical member to said drive means; first means coupled to said drive means for generating a reference signal indicative of the relative angular displacement of said drive means relative to said reference support member; second means coupled to said first means for comparing said reference signal with an externally applied data signal indicative of a particular position at which said mechanical member is to be stopped relative to said reference support member; and means responsive to said second means for arresting the motion of said mechanical member, relative to said reference support member, upon correlation of said reference signal with said data signal, said permanent magnet phase coupling arrangement being released when the motion of said mechanical member is arrested to permit said drive means to continue to rotate about its axis.

14. A position control system comprising:
a reference support member;
a drive shaft mounted for rotational movement about its longitudinal axis relative to said reference member;
a motor drive coupled to one extremity of said drive shaft for producing said rotational movement of said drive shaft about its longitudinal axis;
a mechanical member mounted about said drive shaft and adapted to freely rotate thereabout;
a stop device which when engaged operates to arrest free rotation of said mechanical member with respect to said drive shaft and stop its motion relative to said reference member;
means responsive to an applied data signal depicting information as to a magnitude of angular displacement of said mechanical member relative to said reference member, said magnitude of angular displacement being a function of a particular one of a plurality of stop positions, for disengaging said stop device thereby allowing free rotation of said mechanical member about said drive shaft;
permanent magnet phase coupling means coupled to said drive shaft and to said mechanical member for driving said mechanical member with said drive shaft in fixed phase relationship therebetween;
means coupled to said drive shaft for generating a reference signal which is proportional to the magnitude of changing angular displacement of said drive shaft relative to said reference member;
first means for comparing said reference signal and said data signal and for producing an output signal when the signals compared therein are substantially equal;
delay means for delaying the output signal of said first means for a period of time sufficient to permit said fixed phase relationship between said mechanical member and said drive shaft to be established by said permanent magnet phase coupling means; and
second means responsive to the delayed output signal for engaging said stop device with said mechanical member for arresting the motion of said mechanical member at said selected stop position of said mechanical member with respect to said reference member, said permanent magnet phase coupling means being releasable so that said drive shaft may continue to rotate about its longitudinal axis after said mechanical member has been stopped.

15. A position control system including:
a reference support member;
a drive shaft mounted for rotational movement about its longitudinal axis relative to said reference member;
a motor drive coupled to one extremity of said drive shaft for producing said rotational movement of said drive shaft about its longitudinal axis;
a mechanical member mounted about said drive shaft and adapted to be rotated thereabout, said mechanical member being further adapted to have said rotation about said drive shaft be stopped at any of a plurality of preselected stop positions;
a stop device which when engaged operates to arrest the motion of said mechanical member relative to said reference member, said drive shaft being freely rotatable relative to said mechanical member when the motion thereof has been arrested;

means responsive to an applied data depicting information as to the magnitude of the angular displacement relative to said reference member of a particular one of said stop positions for disengaging said stop device so as to allow free rotation of said mechanical member about said drive shaft;

permanent magnet phase coupling means coupled to said drive shaft and to said mechanical member for rotating said mechanical member in a fixed phase relation to said drive shaft;

means coupled to said drive shaft for generating a respective signal whose magnitude is a function of the angular displacement of said drive shaft with respect to said reference member;

first means for comparing said reference and data signals and for producing a delayed output signal when said reference and data signals are compared in a predetermined relationship therein, the delay of said delayed output signal being a function of the rate of rotation of said drive; and second means responsive to the delayed output signal of said first means for re-engaging said stop device so as to stop the rotation of said mechanical member at one of said stop positions.

References Cited by the Examiner
UNITED STATES PATENTS

| | | | |
|---|---|---|---|
| 2,191,234 | 2/40 | Hicks | 340—146.2 |
| 2,241,983 | 5/41 | Connolly | 310—104 |
| 2,481,360 | 9/49 | Sprenger | 310—103 |
| 2,672,067 | 3/54 | Hansell | 192—142 |
| 2,757,364 | 7/56 | Hood | 310—104 X |
| 2,854,114 | 9/58 | Hillyer | 192—143 |
| 2,858,461 | 10/58 | Hague et al. | 310—104 |
| 2,896,845 | 7/59 | Hansen et al. | 340—325 |
| 2,909,769 | 10/59 | Spaulding | 340—347 |
| 2,930,030 | 3/30 | Hirose | 340—347.3 |
| 2,989,680 | 6/61 | Weiser et al. | 340—347.3 |
| 3,056,126 | 9/62 | Preston | 340—316 |

NEIL C. READ, *Primary Examiner.*

IRVING L. SRAGOW, STEPHEN W. CAPELLI,
*Examiners.*